June 30, 1970 C. T. LUCE 3,518,355

ELECTROMAGNETIC SHIELD

Filed Dec. 6, 1968 3 Sheets-Sheet 1

INVENTOR:
Carl T. Luce

By Smyth, Roston & Pavitt
ATTORNEYS

ELECTROMAGNETIC SHIELD
Filed Dec. 6, 1968 3 Sheets-Sheet 2
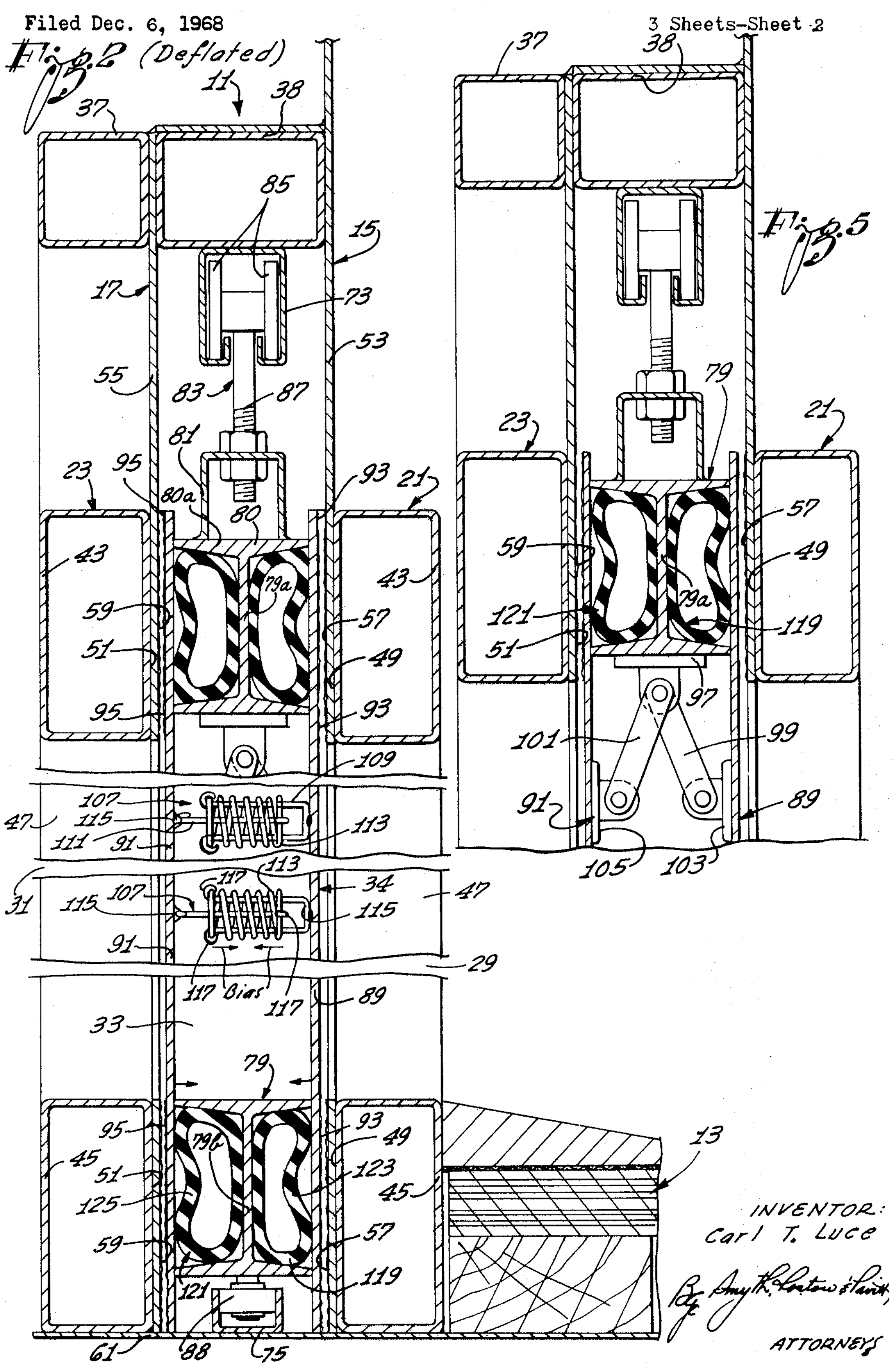
FIG. 2 (Deflated), FIG. 5
INVENTOR:
Carl T. Luce
By [signature]
ATTORNEYS ELECTROMAGNETIC SHIELD
Filed Dec. 6, 1968 3 Sheets-Sheet 3
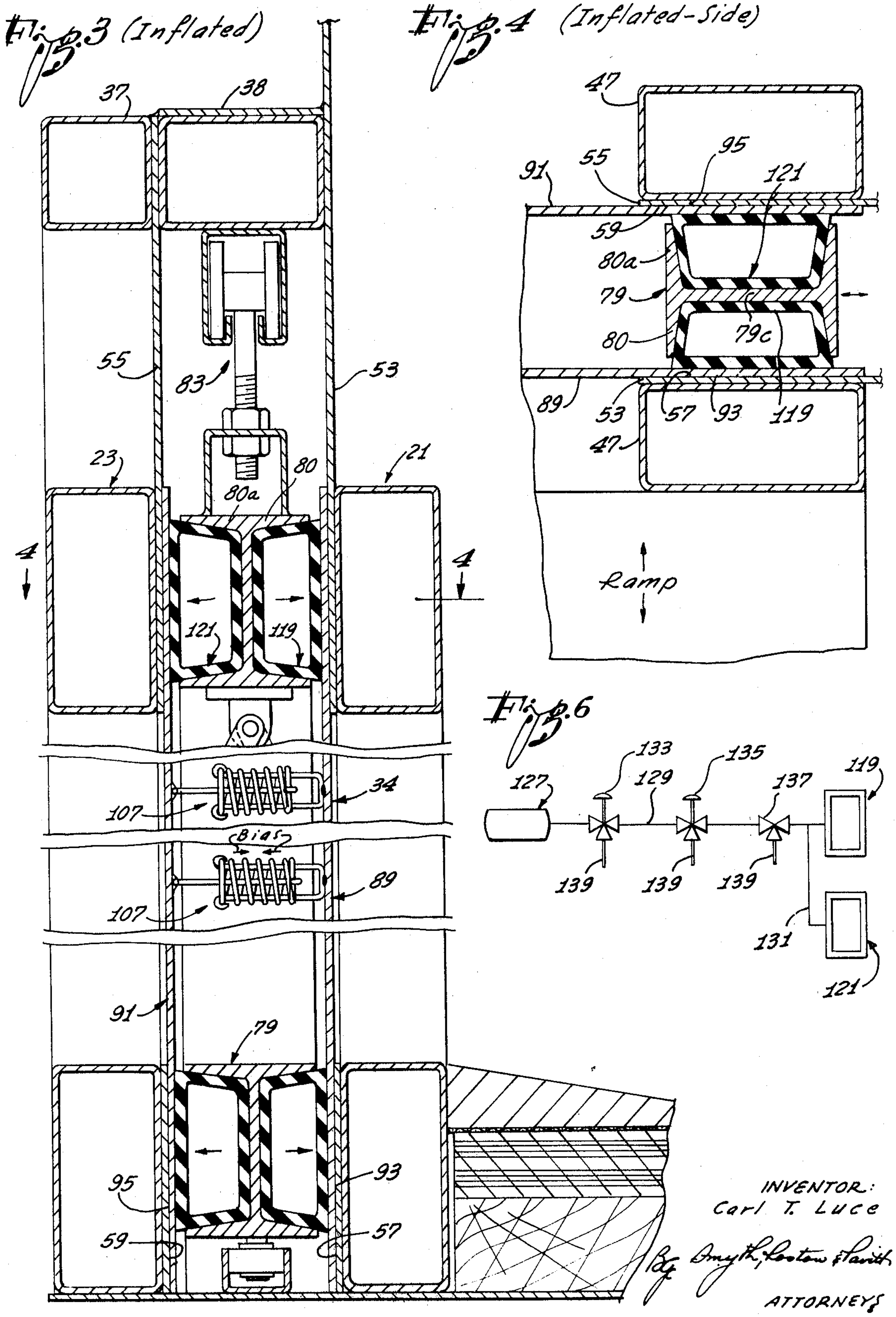
FIG. 3 (Inflated), FIG. 4 (Inflated-Side), FIG. 6
INVENTOR:
Carl T. Luce
By Smyth, Roston & Pavitt
ATTORNEYS

United States Patent Office 3,518,355

Patented June 30, 1970

3,518,355

ELECTROMAGNETIC SHIELD

Carl T. Luce, Woodland Hills, Calif., assignor to Lectromagnetics Inc., Los Angeles, Calif., a corporation of California Filed Dec. 6, 1968, Ser. No. 781,895

Int. Cl. H05k *9/00*

U.S. Cl. 174—35 24 Claims

ABSTRACT OF THE DISCLOSURE

This disclosure describes a room or enclosure which is shielded against electromagnetic radiation. The room has a wall with an opening therein. A door is provided for sealing the opening, the door being urged against the surface of the wall surrounding the opening by a force which extends at least substantially continuously around the opening.

BACKGROUND OF THE INVENTION

It is often necessary to provide a room of relatively large size which is shielded against electromagnetic radiation. Such shielded rooms are used, for example, for circuit testing, for RF emission tests, for housing certain computer installations, etc.

A shielded room of the type to which the present invention is directed is a specially made enclosure and is of sufficient size to permit workmen to conduct various work operations therein. The enclosure must be provided with an opening of sufficient size to permit passage of workmen and equipment therethrough. A primary problem with construction of a shielded enclosure is to provide a door which will completely seal the opening against electromagnetic radiation.

The shielded room and door must be constructed of a metal which will afford substantial protection against electromagnetic radiation. Gaps between the metal surfaces of the wall and door must be avoided. The typical hinged door often uses finger stock, which is a strip of spring metal having a plurality of closely adjacent spring fingers, in an attempt to effect a seal. This arrangement is unsatisfactory because of the many gaps in finger stock.

Prior art shielded doors are usually held against a wall of the shielded enclosure by a latch. In actual practice, the engaging surfaces of the door and wall are not perfectly flat and cannot be made perfectly flat. Thus, to the extent that the surfaces are not completely flat and coplanar, gaps between the surfaces are created. In an effort to overcome this problem, the engaging surfaces of the door and enclosure are meticulously machined at considerable expense. The door must then be very accurately mounted on the wall to assure proper engagement of the surfaces in the closed position of the door. Notwithstanding these expensive and tedious work operations, prior art constructions have proved unsatisfactory in that the latch may hold a local region of the door tightly against the wall, but it does little to assure that the entire periphery of the door will be tightly sealed to the wall surface.

SUMMARY OF THE INVENTION

The present invention eliminates these problems by providing a door which engages the wall around the opening and is tightly held thereagainst by means which apply a force directly to the door at a plurality of circumferentially spaced points therealong. Thus, with the present invention, the door is preferably urged against the wall along a continuous region of the door which surrounds the opening. This continuous pressure makes a very tight metal-on-metal seal. Because the pressure is applied uniformly and continuously completely along the full length of the sealing surfaces of the door and wall, these surfaces need not be meticulously machined and only reasonable care is required in hanging the door on the wall.

Although the continuous uniform pressure taught by the present invention can be provided by several different structures, it is preferred to utilize an inflatable member or bladder. The inflatable member is preferably flexible and circumscribes the opening in the wall to directly apply a continuous uniform force to the door in a zone which completely circumscribes the opening. The inflatable member may be inflated with either a liquid or a gas with compressed air being preferred.

More particularly, the wall defines a seating surface which preferably completely circumscribes the opening. It is this seating surface with which the door must be urged into tight engagement. Preferably, the inflatable member extends along such seating surface and applies a force directly to the door tending to urge the latter into engagement with this seating surface. Of course, the inflatable member may be moved radially inwardly or outwardly of the seating surface and still provide an effective seal; however, to the extent that the inflatable member is so moved, the effectiveness of the seal is reduced. Similarly, the inflatable member need to extend continuously and completely around the opening but to the extent that it does not, the sealing effectiveness is reduced.

The seating surface on the wall and the surface on the door which is forced into engagement therewith are preferably constructed of a relatively soft metal so that some cold flow thereof can occur when these two surfaces are urged tightly into engagement. In addition, these surfaces are preferably roughened to further improve the seal formed thereby. It has been found that a layer of tin having a roughened outer surface is most satisfactory. The tin is sufficiently soft to provide some cold flow capability and in addition is slow to oxidize. Thus, the oxide need only be removed from the tin very infrequently, whereas with other materials that might otherwise be satisfactory, more frequent oxide removal is necessary.

These concepts can be advantageously embodied in a shielded enclosure which includes a wall having an opening therein and a seating surface substantially circumscribing the opening and a door including a door member siezed to cover the opening and engage the seating surface. The door is mounted on the wall for movement between a first position in which the door member generally confronts the opening and an open position in which the door is positioned to at least partially expose the opening.

The bladders apply substantial force to the plate members of the door and this force in turn is applied to the seating surfaces. It is important therefore that the seating surfaces be backed up by structurally strong members and in a preferred embodiment of the present invention, such strong members include a pair of frames of tubular construction. If the bladders were fully inflated when the door was not confronting the seating surfaces or the frames, the forces applied thereto may be sufficient to damage or destroy the adjacent wall members. Accordingly, the present invention provides control valve means responsive to the door being out of alignment with the frames to automatically prevent inflation of the bladders and responsive to the door being in alignment with the frames to permit inflation of the bladders.

The door includes a door member which is mounted for movement toward and away from the opening when the door is in the first position thereof. Force applying means apply a force directly to the door member at the region thereof engageable with the seating surface to urge the door member into engagement with the seating surface. The force is preferably applied uniformly and at least substantially continuously along a path which at least substantially completely surrounds the opening.

The door member can be mounted for outward movement by a double hinge or by a link pivotally connected at one end to the door member and at the other to a suitable supporting member. The door of this invention is preferably slidable between the open and first positions thereof and biasing means are preferably provided to urge the door member away from the seating surface upon deflation of the inflatable member. This facilitates movement of the door to the open position. Preferably, the system is made redundant by providing two of the seating surfaces and two of the door members which can be urged, respectively, into engagement with the seating surfaces by individual inflatable members. With this arrangement, should one of the inflatable members fail, the other will still be operative to shield the enclosure.

The invention, both as to its organization and method of operation together with further features and advantages thereof may best be understood by reference to the following description taken in connection with the accompanying illustrative drawings.

BRIEF DESCRIPTION OF THE DRAWINGS

FIG. 2 is an enlarged fragmentary sectional view taken along line 2—2 of FIG. 1 with the inflatable members in the deflated condition and with the door confronting the opening through the wall of the enclosure.

FIG. 3 is a view similar to FIG. 2 with the inflatable members inflated and the door in the closed position.

FIG. 4 is a fragmentary sectional view taken along line 4—4 of FIG. 3.

FIG. 5 is a fragmentary sectional view illustrating the means for mounting of the door members for movement toward and away from the seating surfaces.

FIG. 6 is a schematic view of some of the basic elements of the pneumatic control system for the bladders.

DESCRIPTION OF THE PREFERRED EMBODIMENTS

Figure 1A:
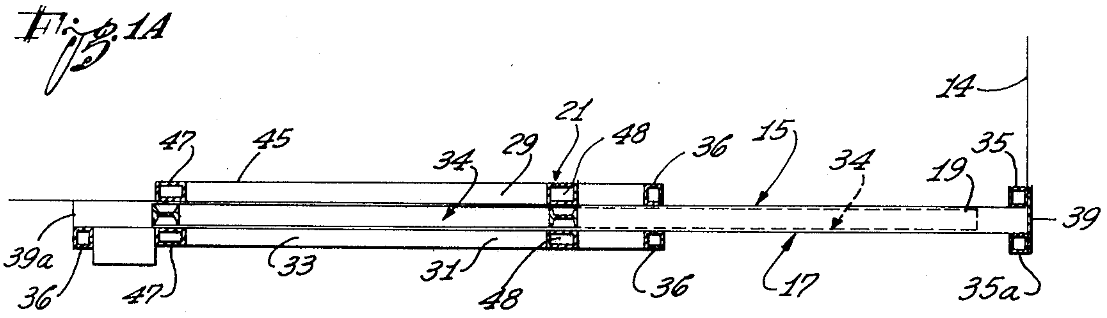
FIG. 1A is a sectional view taken generally along line 1A—1A of FIG. 1.
Figure 1:
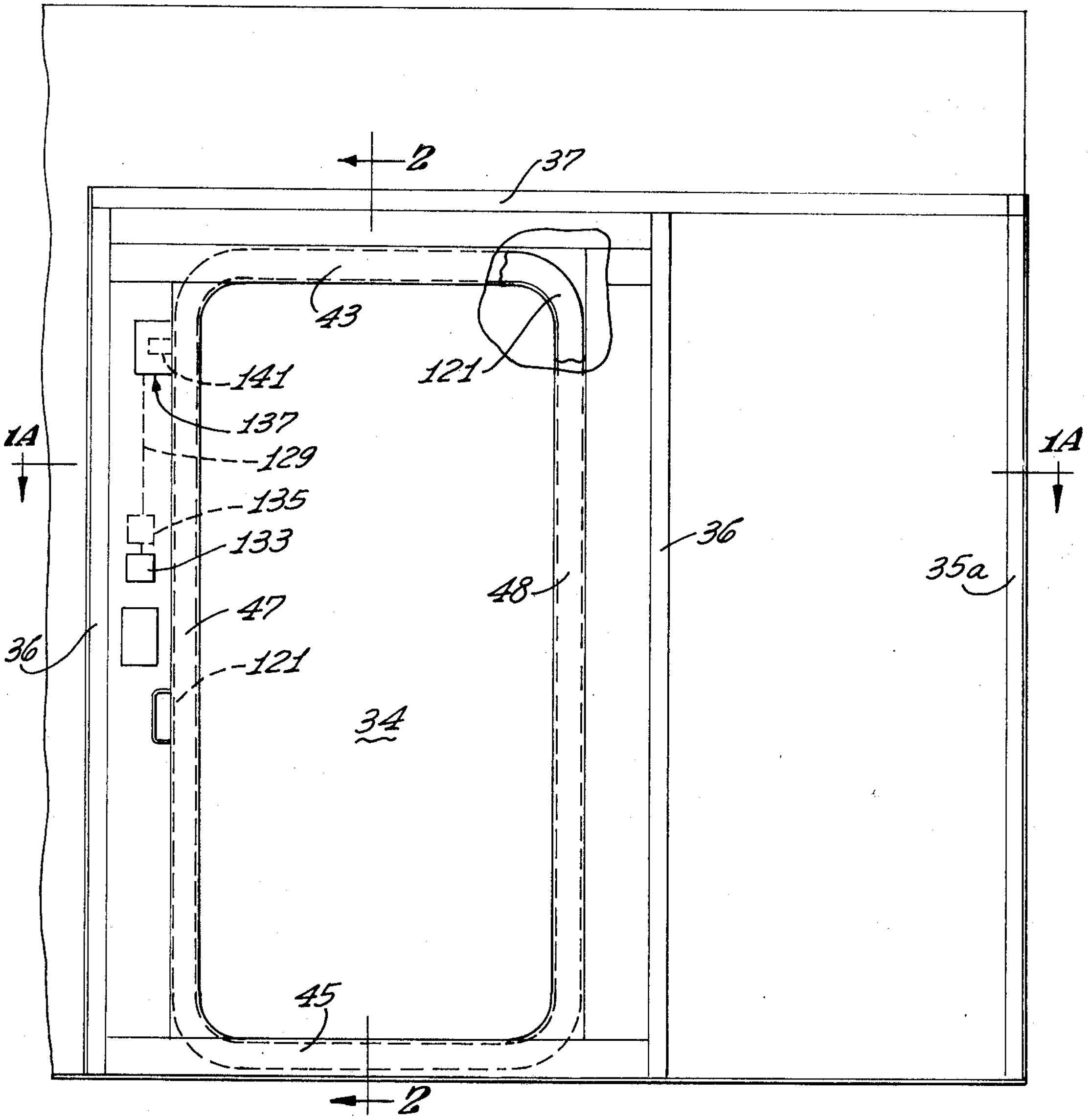
FIG. 1 is a fragmentary front elevational view of a shield enclosure constructed in accordance with the teachings of this invention and illustrating the door in the closed position.

Referring to the drawings and in particular to FIGS. 1 and 1A, reference numeral 11 designates a wall of an electromagnetically shielded enclosure. The enclosure has a bottom wall or floor 13 (FIG. 2), a side wall 14 (FIG. 1A) and a ceiling and other side walls (not shown) arranged to form an enclosure which affords protection against electromagnetic radiation. Except for the wall 11, the walls, ceiling and floor of the enclosure may be of conventional construction and materials to provide an enclosure having good shielding qualities.

Generally, the wall 11 includes spaced parallel wall members 15 and 17 of electromagnetic shielding material (FIG. 1A) which define a gap 19 therebetween. The wall members 15 and 17 include tubular frames 21 and 23, respectively. The frames 21 and 23 define apertures 29 and 31, respectively, which together define an opening 33 which extends completely through the wall 11. Thus, the wall 11, except for the opening 33, provides an electromagnetic shield. The opening 33 can be closed and sealed against electromagnetic radiation by a door 34 which is slidable in the gap 19 between a position in which the door confronts the opening 33 and an open position in which the door is moved laterally to expose the opening 33. The open position of the door is shown in dashed lines in FIG. 1A.

More particularly, the wall 11 includes spaced vertical corner posts 35 and **35*a* and a plurality of intermediate posts 36 (three being illustrated in FIG. 1A). The upper ends of the corner post 35*a* and two of the intermediate posts 36 are interconnected by a horizontal beam 37 (FIG. 1) and the upper ends of the other post 36 and the corner post 35 may be similarly interconnected by a similar beam (not shown). As shown in FIG. 2, a beam 38 extends along the inner side of the beam 37** for a purpose described hereinbelow.

The wall members 15 and 17 are suitably connected, as by welding, to the posts 35, **35*a* and 36 and to the beams 37 and 38 to thereby fill all of the gaps defined by these members except for the opening 33 which is to be closed by the door 34. Of course, various framing arrangements can be utilized to support the wall members 15 and 17 and the one illustrated in the drawings is presented merely by way of illustration. In the embodiment illustrated, the openings at the ends of the wall members 15 and 17 are closed by end plates 39, 39*a* (FIG. 1A). The wall member 15 may extend to the left beyond the end plate 39*a*** as shown in FIG. 1A, if desired.

With reference to FIGS. 1, 1A and 2, each of the frames 21 and 23 includes upper and lower horizontal frame members 43 and 45 and spaced vertical frame members 47 and 48. The frames 21 and 23 are preferably of strong, tubular construction with the several frame members of each of the frames being suitably interconnected as by welding. As shown in FIG. 1, the frame members 43 and 45 extend laterally beyond the members 47 and 48 and are joined to the posts 36. The frames 21 and 23 have confronting surfaces 49 and 51 which completely surround the opening 33.

As shown in FIG. 2, beams 37 and 38 support a pair of spaced horizontal plate portions 53 and 55 of the wall members 15 and 17, respectively. The plate portions 53 and 55 extend toward the horizontal frame members 43 and surfaces 49 and 51, respectively, of the frame members 43.

The plate portions 53 and 55 extend continuously along the surfaces 49 and 51 of the frames 21 and 23 to serve in effect as a metal liner for the confronting surfaces 49 and 51. Each of the plate portions 53 and 55 has an aperture therethrough in registry with the apertures 39 and 31 to thereby further the opening 33.

The plate portions 53 and 55 define confronting seating surfaces 57 and 59, respectively. Each of the seating surfaces 57 and 59 extend completely and continuously around the opening 33 along the frames 21 and 23. The seating surfaces 57 and 59 may have a radial dimension approximately equal to the radial thickness of the frames 21 and 23. Each of the seating surfaces 57 and 59 is preferably defined by a layer of tin which has been suitably applied to the wall portions 53 and 55, respectively. The layer of tin preferably has a roughened outer surface. As shown in FIG. 2, the seating surfaces 57 and 59 are structurally supported and backed up by the frames 21 and 23, respectively.

A bottom metal flooring member 61 forms the lowermost member of the enclosure and extends beneath the horizontal frame members 45. An upper track member 73 is mounted on and depends from the beam 38. A lower track member 75 is mounted on, and extends upwardly from, the flooring member 61.

The door 34 is mounted on the track members 73 and 75 for movement between a first position shown in full lines in FIG. 1A wherein the door confonts the opening 33 and an open position shown in dashed lines in FIG. 1A wherein the opening 33 is open or exposed to permit entry into the enclosure. As explained hereinbelow, the opening 33 may or may not be closed when the door is in the "first position."

The door 34 includes a support member 79 having an I-beam shaped cross section and extending completely around the opening 33, as shown in FIGS. 2 and 4. The support member forms an open frame which extends along a peripheral region of the door 34 and generally confronts the seating surfaces 57 and 59.

The support member 79 may be formed of welded construction and may include spaced horizontal sections **79*a* and 79*b* which extend along the members 43 and 45, respectively and spaced vertical sections 79*c* (only one being shown in FIG. 4) which extend along the members 47 and 48, respectively, when the door is in the closed position. The members 79*a*, 79*b* and 79*c* may be suitably interconnected as by welding. As shown in FIGS. 2–4, the I-beam cross section defines two oppositely directed saddles 80 and 80*a*. The saddles 80 and 80*a* extend along and open toward the seating surfaces 57 and 59**, respectively.

The support member 79 is hung from the track 73 by an elongated channel 81 which is affixed to the upper end of the support member 79 and a plurality of trolleys 83. Each of the trolleys 83 includes a pair of rollers 85 mounted for rolling movement along the track 73 and a hanger 87 in the form of a rod interconnecting the rollers 85 and the channel 81. Any suitable number of trolleys 83 may be provided in spaced relationship along the channel 81. The lower end of the door 34 is guided by one or more rollers 88 which are mounted for rolling movement in the track 75.

The door 34 also includes two parallel door or plate members 89 and 91. The plate members 89 and 91 are formed of suitable material, shielding material or metal and are sized to completely cover the apertures 29 and 31, respectively, and to confront the seating surfaces 57 and 59. The plate members 89 and 91 have sealing surfaces 93 and 95, respectively, which are substantially coextensive with the seating surfaces 57 and 59, respectively, when the door 34 is in the closed position. The sealing surfaces 93 and 95 are those surface regions of the plate members 89 and 91 which engage the seating surfaces 57 and 59 in the closed position. Thus the surfaces 93 and 95, in the embodiment illustrated are peripheral surface regions of the plate members 89 and 91. The sealing surfaces 93 and 95 may be relatively rough and formed from tin as described hereinabove in connection with the seating surfaces 57 and 59.

The plate members 89 and 91 are mounted on the support member 79 for movement toward and away from the seating surfaces 57 and 59, respectively. Although various mounting means may be utilized, a double hinge mechanism is preferred because of its simplicity. In a double hinge mechanism of the type referred to, a suitable interconnecting member is pivotably connected at one end to the support member 79 and at the other end to one of the plate members 89 and 91. Although such means may include two conventional hinges suitably interconnected, in the embodiment shown in FIG. 5, a slightly different arrangement is employed.

As shown in FIG. 5, a mounting lug 97 is mounted on the section **79*a* of the support member 79 and a pair of links 99 and 101 are pivotally attached at one end to the lugs 97. Lugs 103 and 105 are rigidly affixed to the plate members 89 and 91, respectively, and the opposite ends of the links 99 and 101 are pivotally secured thereto. This double hinge arrangement permits movement of the plate members 89 and 91 toward and away from the seating surfaces 57 and 59 while imparting only slight elevational changes to the plate members 89 and 91. Preferably, at least two sets of links 99 and 101 are provided in spaced relationship along the upper section 79*a* of the support member 79**. The double hinge arrngement is preferred because of its simplicity and low cost.

Means are provided for urging the plate members 89 and 91 toward each other. In the embodiment illustrated, such means includes a pair of retractors 107 (FIG. 2). Although the retractors 107 may take various forms, in the embodiment illustrated each of the retractors 107 includes a pair of U-shaped, rod-like members 109 and 111 secured, respectively, to the plates 89 and 91. A spring 113 interconnects both of these members 109 and 111 to bias the plate members 89 and 91 toward each other and away from the seating surfaces 57 and 59. In the embodiment illustrated, the web portion 115 of each of the U-shaped members 109 and 111 are affixed to the plate members 89 and 91 and the end portions 117 of each of the U-shaped members 109 and 111 are curled around the opposite ends of the spring 113.

A pair of flexible inflatable bladders 119 and 121 are mounted on the support member 79 of the door 34 for movement with the door. The bladders 119 and 121 are seated within the saddles 80 and **80*a*, respectively as shown in FIGS. 2–5. The bladders preferably extend completely and continuously around the opening 33 and directly confront the seating surfaces 57 and 59 and the sealing surfaces 93 and 95. The shape of the bladder 121** in elevation is shown in dashed lines in FIG. 1. The bladder may be rounded and radially widened at corners as shown in FIG. 1.

The bladders 119 and 121 may be inflated with any suitable fluid with compressed air being preferred. The bladders 119 and 121 have central portions 123 and 125, respectively, which in the deflated condition shown in FIG. 2 are retracted inwardly from the plate members 89 and 91, respectively. Thus, in the deflated condition, each of the bladders 119 and 121 is generally kidney-shaped in cross section.

When the bladders are inflated as shown in FIG. 3, they assume the cross sectional outline of the saddles 80 and **80*a* and of the plate members 89 and 91. Thus, the bladders are generally trapezoidal in cross section in the inflated condition. When the bladders 119 and 121 are inflated, they apply a uniform and continuous pressure to a peripheral extending region of each of the plate members 89 and 91. Each of the peripheral regions of the plate members 89 and 91 to which this force is applied preferably has significant radial width as shown, for example, in FIGS. 2 and 3. Furthermore, each of the peripheral regions to which this force is applied extends completely around the opening 33 and directly confronts the seating surfaces 57 and 59 and the sealing surfaces 93 and 95. The force applied by the bladders 119 and 121 is applied substantially perpendicularly to the sealing surfaces 93 and 95 and to the seating surfaces 57 and 59. Thus, the use of the bladders 119 and 121 assures that continuous uniform pressure will be exerted to circumscribing regions of the plate members 89 and 91 so that the sealing surfaces 93 and 95 will be urged into tight engagement with the seating surfaces 57 and 59. With this arrangement, even if the plate members 89 and 91 are not precisely machined, the large force applied to the plate members distorts them into tight sealing contact with the seating surfaces 57 and 59**.

The pneumatic control system shown in FIG. 6 may be utilized for inflating the bladders 119 and 121. The control system may include a tank 127 or other suitable pressure vessel for containing a supply of air under pressure. The tank 127 supplies air to the bladders 119 and 121 through a conduit 129 and a branch conduit 131 which leads to the bladder 121. Two manual 3-way control valves 133 and 135 and one normally closed 3-way valve 137 are arranged in series in the conduit 129. Each of the control valves 133, 135 and 137 has a vent connection 139 leading to atmosphere.

Each of the manual 3-way control valves 133 and 135 has a first or open position and a second or closed position. In the open position compressed air can flow therethrough from the pressure vessel 127 toward the bladders 119 and 121 while the vent 139 thereof is closed. In the closed position the port of the valve leading to the pressure vessel 127 is closed while the vent 139 thereof is open to bleed fluid in the conduit 129 downstream thereof to atmosphere. The valves 133 and 135 are independently manually controllable.

The valve 137 has open and closed positions as described above in connection with the manual valves 133 and 135. However, the valve 137 is normally biased toward the closed position in which the port thereof leading to the supply air is shut off and the vent 139 is open to bleed air from the conduit 129 downstream thereof, the conduit 131 and the bladders 119 and 121.

The valve 137 should be mounted so that it is automatically operated by the door 34. Specifically, the valve 137 should be moved to the open position only when the door 34 is properly aligned with the frames 21 and 23. In the specific embodiment illustrated in FIG. 1, the valve 137 is located along the lefthand edge of the door 34. The valve 137 preferably has an extendable actuating element 141 which is spring-loaded outwardly and which can be depressed inwardly by any suitable portion of the door to open the valve 137 only when the door is properly aligned with the frames 21 and 23. In the position shown in FIG. 1, the actuating element 141 has been depressed inwardly by the door 34.

The manual valves 133 and 135 can be mounted in any suitable location and in any suitable manner; however, it is preferred to mount one of the manual valves on the interior of the shielded enclosure and the other of the manual valves on the exterior of the shielded enclosure. In the specific embodiment illustrated in FIG. 1, the valve 133 is shown in diagrammatic form as being adjacent the left edge of the door 34 and on the exterior of the wall 11 whereas the valve 135 is mounted at a substantially corresponding location on the interior of the wall 11. As the valves 133, 135 and 137 are connected in series, all of these valves must be open at the same time in order to inflate the bladders 119 and 121.

When the door 34 is in the open position, it is between the plate members 15 and 17 as shown in phantom in FIG. 1A, In this position, the door is displaced laterally from the opening 33 to expose the opening. The retractors 107 hold the plate members 89 and 91 in position spaced inwardly from the seating surfaces 57 and 59 to permit free sliding of the door 34 without interference from the seating surfaces.

If it is desired to close the door, the door is moved from the open position as permitted by the trolleys 83 and rollers 88 to the position shown in FIG. 2 in which the door 34 confronts and is substantially aligned with the opening 53. In this position, the retractors 107 are still operative to maintain the plate members 89 and 91 spaced inwardly from the associated seating surfaces 57 and 59.

Before inflating the bladders 119 and 121, it is very important that the door be properly positioned between the frames 21 and 23 and in alignment with the opening 33. If the bladders were inflated and they were laterally displaced from the frames 21 and 23, the force applied thereby to the plate members 89 and 91 would undoubtedly cause structural failure of the plate members. As the door is moved along the tracks 73 and 75, it ultimately strikes and depresses the actuator element 141 of the valve 137. The actuator element 141 is so arranged that when the door completely covers the opening 33 and is properly aligned with the sealing surfaces 93 and 95, the element 141 is completely depressed. Depressing of the element 141 closes the vent 139 thereof and opens the conduit 129 for the supply of fluid under pressure to the bladders 119 and 121. Thus, by manually opening the valve 133 and 135, air under pressure from the tank 127 can inflate the bladders 119 and 121. Each of the bladders 119 and 121 are restrained on all sides except the sides thereof confronting the plate members 89 and 91, respectively. Accordingly, inflation of the bladders urges the plate members toward their respective seating surfaces 57 and 59. Such movement of the plate members 89 and 91 is permitted by the links 99 and 101 which pivot to cause slight elevation of the plate members as they move toward their respective seating surfaces. This movement of the plate members 89 and 91 is resisted by the retractors 107.

Ultimately, the sealing surfaces 93 and 95 are urged tightly into engagement with the seating surfaces 57 and 59, respectively. The continuous and uniform pressure applied by the bladders 119 and 121 may cause some cold flow of the layers of tin defining the surfaces 57, 59, 93 and 95. In any event, the surfaces are preferably roughened to form a tight electromagnetic seal.

With the plate members 89 and 91 tightly sealed against the seating surfaces 57 and 59, a very reliable shield is formed. It should be noted, that the door 34 is a redundant system in that should one of the bladders 119 and 121 fail, the other would be operative to effect a tight electromagnetic shield. In this connection it should be noted that the wall members 15 and 17 and the end plates 39 and 39*a* along with the door 34 define a completely sealed enclosure or double layer wall. If a redundant system is desired, the end plates 39 and 39*a* are necessary so that the outer plate member 91 can be effective as a shield. Of course, the present invention is not limited to a redundant system.

When it is desired to open the door, the bladders 119 and 121 are deflated and the retractors 107 are automatically operative to separate the plate members 89 and 91 from the seating surfaces 57 and 59 by moving the plate members toward each other slightly. When the bladders are inflated, the force of friction between the plate members 89 and 91 and the seating surfaces 93 and 95 is so great that the door 34 could not be moved toward the open position. Thus, there is no danger that the door will be moved away from the frames 21 and 23 with the bladders 119 and 121 inflated.

To deflate the bladders 119 and 121, one or both of the manual valves 133 and 135 is moved to the closed position to allow all of the air under pressure downstream thereof to exit through the vent 139. When the bladders 119 and 121 are deflated, the door 24 can be moved to the open position. As the door moves slightly away from the position in which it is aligned with the opening 33, the actuator element 141 is spring-biased outwardly to move the valve 137 to the closed position. With the valve 137 closed no fluid upstream of the valve 137 can enter the bladders 119 and 121 and any residual pressure in the bladders is bled to atmosphere via the vent 139 of the valve 137. Thus, with the door 34 open, the valves 133 and 135 can not cause inflation of the bladders 119 and 121.

Although exemplary embodiments of the invention have been shown and described, many changes, modifications and substitutions may be made by one having ordinary skill in the art without necessarily departing from the spirit and scope of this invention.

I claim:

1. A wall construction comprising:

a wall having an opening therein with a surface substantially circumscribing the opening, said wall defining a gap laterally of said opening;

a door including a supporting structure, a plate member and means mounting said plate member on said supporting structure for movement along a path;

means mounting said door for movement between a first position in which said plate member confronts said opening and an open position in which said door is at least partially within said gap with said opening being at least partially exposed, said path being in a direction generally toward and away from said surface at least when the door is in said first position;

a substantially rigid member spaced from said surface;

inflatable means acting between said plate member and said rigid member and operable with said door in said first position for urging said plate member along said path and into engagement with said surface to thereby close said opening, said inflatable means being carried by said door; and means for admitting a gas under pressure to said inflatable means.

2. An electromagnetic shield comprising:

a wall including first and second spaced wall members defining a gap therebetween, said first and second wall members having first and second apertures, respectively, defining an opening through said wall, said first and second wall members having first and second seating surfaces surrounding said first and second apertures, respectively, said wall affording substantial protection against electromagnetic radiation;

a door;

means mounting said door for movement in said gap between a first position in which said door confronts said opening and an open position in which said door is displaced laterally of said first position to at least partially expose said opening;

said door including first and second plate members and means mounting said plate members for movement generally toward and away from said first and second seating surfaces, respectively, at least when said door is in said first position, said door affording substantial protection against electromagnetic radiation; and inflatable means between said plate members for urging said first and second plate members generally away from each other into tight engagement with said first and second seating surfaces, respectively, whereby said apertures and said opening are tightly closed to thereby define a closed position.

3. A shield as defined in claim 2 wherein said inflatable means is carried by said door and movable with said door between said first position and said open position.

4. A shield as defined in claim 2 including retracting means for urging said plate members generally toward each other whereby upon deflation of said inflatable means the plate members are moved generally toward each other by said retracting means.

5. A shield as defined in claim 2 including means between said plate members for mounting said inflatable means between said plate members.

6. An electromagnetic shield comprising:

a wall including first and second spaced wall members defined a gap therebetween, said first and second wall members having first and second apertures, respectively, defining an opening through said wall, said first and second wall members having first and second seating surfaces surrounding said first and second apertures, respectively, said wall affording substantial protection against electromagnetic radiation;

a door;

track means mounted on said wall mounting said door for movement in said gap between a first position in which said door confronts said opening and an open position in which said door is displaced laterally of said first position to at least partially expose said opening;

said door including first and second plate members and means mounting said plate members for movement toward and away from said first and second seating surfaces, respectively, at least when said door is in said first position, said door affording substantial protection against electromagnetic radiation;

at least one of said surfaces being coated with a conductive metal; and inflatable means between said plate members and carried by said door for urging said first and second plate members generally away from each other into tight engagement with said first and second seating surfaces, respectively, whereby said apertures and said opening are tightly closed.

7. A combination as defined in claim 6 wherein said plate member mounting means includes first and second saddles opening respectively toward said first and second plate members, respectively, said inflatable means includes first and second inflatable bladders mounted in said first and second saddles, respectively, each of said bladders at least substantially completely circumscribing said opening, said first and second bladders being held between said first and second saddles and said first and second plate members, respectively, to urge said plate members into engagement with the associated seating surfaces.

8. A combination as defined in claim 6 including means responsive to the movement of said door out of said first position for preventing the inflation of said inflatable means until said door is returned to substantially said first position.

9. A shield as defined in claim 6 wherein said conductive metal has a roughened outer surface.

10. A shield as defined in claim 6 including biasing means for resiliently urging said plate members toward each other.

11. A shield as defined in claim 6 wherein said inflatable means includes first and second bladders, said door includes means for mounting said bladders between said plate members.

12. An electromagnetic shield comprising:

a wall including first and second spaced wall members defining a gap therebetween, said first and second wall members having first and second apertures, respectively, defining an opening through said wall, said first and second wall members having first and second seating surfaces generally circumscribing said first and second apertures, respectively, said wall affording substantial protection against electromagnetic radiation;

a door;

means mounting said door for movement in said gap between a first position in which said door confronts said opening and an open position in which said door is displaced laterally of said first position to at least partially expose said opening;

said door including first and second door members and means mounting said door members for movement generally toward and away from said first and second seating surfaces, respectively, at least when said door is in said first position, said first and second door members generally confronting said first and second apertures, respectively, in said first position, said first and second door members being sized to close said first and second apertures, respectively, and affording substantial protection against electromagnetic radiation; and means between said door members and carried by said door for urging said first and second door members generally away from each other into engagement with said first and second seating surfaces, respectively, whereby said apertures and said opening are tightly closed by said door members.

13. A shield as defined in claim 12 wherein said last mentioned means includes an inflatable bladder for urging the first and second door members into engagement with the first and second seating surfaces and means for admitting air under pressure to the bladder to inflate the bladder.

14. A shield as defined in claim 13 wherein said door includes a supporting structure between said door members, said door members being mounted on said supporting structure for movement toward and away from each other and for movement relative to said supporting structure, said door members, said supporting structure and said means mounting the door members on the supporting structure being movable between said first position and said open position.

15. An electromagnetic shield comprising:

a wall including first and second spaced wall members defining a gap therebetween, said first and second wall members having first and second apertures, respectively, defining an opening through said wall, said first and second wall members having first and second seating surfaces generally circumscribing said first and second apertures, respectively, said wall affording substantial protection against electromagnetic radiation;

a door;

means mounting said door for movement in said gap between a first position in which said door confronts said opening and an open position in which said door is displaced laterally of said first position to at least partially expose said opening;

said door including first and second door members and means mounting said door members for movement generally toward and away from said first and second seating surfaces, respectively, at least when said door is in said first position, said first and second door members generally confronting said first and second apertures, respectively, in said first position, said first and second door members being sized to close said first and second apertures, respectively, and affording substantial protection against electromagnetic radiation;

an inflatable bladder carried by said door between said plate members;

means for filling said bladder with a gas to expand said bladder to urge said first and second door members away from each other and into engagement with said first and second seating surfaces, respectively, whereby said apertures and said opening are tightly closed by said door members to define a closed position of the door;

means for allowing escape of the air from the bladder to thereby deflate the bladder and permit movement of the door members toward each other and away from their respective seating surfaces; and said door and said wall being generally vertical.

16. A combination as defined in claim 15 including means for biasing said door member away from said seating surface whereby deflation of said bladder means permits said biasing means to automatically move said door member away from said seating surafce to thereby facilitate movement of said door to the open position.

17. A combination as defined in claim 15 wherein said bladder means at least substantially circumscribes said opening, said supporting structure of said door carrying said bladder means.

18. A combination as defined in claim 15 wherein said means mounting said door member on said supporting structure includes means pivotatlly connected to said door member and pivotally connected to said supporting structure whereby said door member can move toward and away from said seating surface relative to said supporting structure.

19. A combination as defined in claim 15 including control means for preventing the inflation of said bladder means when said door is out of said first position, said control means being responsive to movement of said door to said first position to automatically permit the inflation of said bladder means.

20. An electromagnetic shield as defined in claim 15 wherein said first seating surface is engaged by a first door surface of the first door member in said closed position, at least one of said first surfaces being defined at least in substantial part by a layer of conductive metal retained on its associated member, said one surface being roughened.

21. An electromagnetic shield as defined in claim 15 wherein said door includes a supporting structure between said door members and said door members are mounted on said supporting structure for movement generally toward and away from each other, said supporting structure being movable with said door members between said first position and said open position.

22. An electromagnetic shield comprising:

a generally vertical wall including a wall member having an aperture at least partially defining an opening through said wall, said wall member having a seating surface surrounding said aperture, said wall affording substantial protection against electromagnetic radiation;

a door;

means mounting said door in a generally vertical position on said wall for movement between a first position in which said door confronts said opening and an open position in which said door is displaced laterally of said first position to at least partially expose said opening;

said door including a supporting structure, a door member and means mounting said door member on said supporting structure for movement generally toward and away from said seating surface, at least when said door is in said first position, said door member confronting said aperture in said first position, said door member being sized to close said aperture and affording substantial protection against electromagnetic radiation, said door member and said supporting structure being movable together between said first position and said open position;

a relatively rigid member spaced from said seating surface;

an inflatable bladder carried by said door between said first position and said open position;

valve means for admitting a gas under pressure to said bladder to inflate the bladder, said bladder in the inflated condition and with the door in the first position acting between said relatively rigid member and said door member to urge the door member into tight engagement with the first seating surface to define a closed position of the door; and means for permitting the air in the bladder to escape to deflate the bladder and allow the door member to move away from the seating surface.

23. An electromagnetic shield as defined in claim 22 wherein at least a region of said bladder generally confronts said seating surface and substantially circumscribes said aperture in the closed position.

24. An electromagnetic shield comprising:

a generally vertical wall including a wall member having an aperture at least partially defining an opening through said wall, said wall member having a seating surface surrounding said aperture, said wall affording substantial protection against electromagnetic radiation;

a door;

means mounting said door in a generally vertical position on said wall for movement between a first position in which said door confronts said opening and an open position in which said door is displaced from said first position to at least partially expose said opening;

said door including a door member, a supporting structure and means mounting said door member on said supporting structure for movement generally toward and away from said seating surface, at least when said door is in said first position, said door member generally confronting said aperture in said first position, said door member affording substantial protection against electromagnetic radiation, said door member being sized to close said opening;

an inflatable bladder carried by said door between said first position and said open position;

a relatively rigid member;

means for filling said bladder with a gas to expand said bladder and cause said bladder to act between said door member and said relatively rigid member to move said door member into engagement with said seating surface whereby said opening is tightly closed by said door member; and means for allowing escape of the gas from the bladder to thereby deflate the bladder and permit movement of the door member away from said seating surface.

References Cited

UNITED STATES PATENTS 2,757,225 6/1956 Dunn.

3,009,984 11/1961 Lindgren.

3,236,935 2/1966 Patton.

3,256,384 6/1966 Lindgren.

DARRELL L. CLAY, Primary Examiner

U.S. Cl. X.R.

49—477